(12) United States Patent
Tewari et al.

(10) Patent No.: US 11,115,326 B2
(45) Date of Patent: Sep. 7, 2021

(54) PORT-BASED MULTI-TENANCY ROUTER TO MANAGE WIRELESS NETWORK

(71) Applicants: Deependra Tewari, Ghaziabad (IN); Vivek R. Kumar, Murrysville, PA (US)

(72) Inventors: Deependra Tewari, Ghaziabad (IN); Vivek R. Kumar, Murrysville, PA (US)

( * ) Notice: Subject to any disclaimer, the term of this patent is extended or adjusted under 35 U.S.C. 154(b) by 0 days.

(21) Appl. No.: 15/043,545

(22) Filed: Feb. 13, 2016

(65) Prior Publication Data
US 2016/0315856 A1 Oct. 27, 2016

Related U.S. Application Data

(60) Provisional application No. 62/117,891, filed on Feb. 18, 2015.

(51) Int. Cl.
| | |
|---|---|
| *H04L 12/773* | (2013.01) |
| *H04L 12/24* | (2006.01) |
| *H04L 29/06* | (2006.01) |
| *H04L 29/08* | (2006.01) |
| *H04W 84/12* | (2009.01) |

(52) U.S. Cl.
CPC .......... *H04L 45/60* (2013.01); *H04L 41/0803* (2013.01); *H04L 41/0893* (2013.01); *H04L 63/0236* (2013.01); *H04L 67/18* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2002/0178268 | A1* | 11/2002 | Aiken, Jr. | H04L 29/06 709/227 |
| 2003/0189930 | A1* | 10/2003 | Terrell | H04L 49/90 370/389 |
| 2004/0111461 | A1* | 6/2004 | Claudatos | H04L 41/0893 709/200 |
| 2004/0111472 | A1* | 6/2004 | Swanson | H04L 12/1822 709/204 |
| 2005/0039042 | A1* | 2/2005 | Liang | H04L 63/1416 726/26 |
| 2005/0261026 | A1* | 11/2005 | Hausman | G05B 19/054 455/559 |
| 2006/0159029 | A1* | 7/2006 | Samuels | H04L 41/0809 370/252 |
| 2007/0087752 | A1* | 4/2007 | Voyer | H04W 24/02 455/436 |
| 2011/0310729 | A1* | 12/2011 | Raman | G06F 11/2007 370/225 |

(Continued)

*Primary Examiner* — Andre Tacdiran

(57) ABSTRACT

In one aspect, a method of a multi-tenancy router to manage a wireless network comprising executing on a processor the following steps. With a port-based multi-tenancy router, assign a set of different behaviors to different ports for wireless network access management of a wireless network. With at least one computer processor, a set of behaviors related to a user of one or more wireless networks are determined. A list of the currently-available ports of the multi-tenancy router is generated. One or more behaviors of each port of the list of currently-available ports are assigned.

6 Claims, 6 Drawing Sheets

(56) References Cited

U.S. PATENT DOCUMENTS

| | | | | |
|---|---|---|---|---|
| 2011/0310863 | A1* | 12/2011 | Shieh | H04L 61/2517 370/338 |
| 2013/0090155 | A1* | 4/2013 | Johnson | G06Q 20/18 463/25 |
| 2013/0262667 | A1* | 10/2013 | Xie | H04L 41/00 709/224 |
| 2014/0119375 | A1* | 5/2014 | Tseng | H04L 49/70 370/392 |
| 2014/0189149 | A1* | 7/2014 | Shmueli | H04L 67/303 709/231 |
| 2014/0211621 | A1* | 7/2014 | Sundaram | H04L 47/41 370/231 |
| 2014/0237351 | A1* | 8/2014 | Seidl | G06F 17/30905 715/234 |
| 2014/0366117 | A1* | 12/2014 | Kumar | H04L 63/02 726/11 |
| 2015/0012640 | A1* | 1/2015 | Toksvig | H04W 4/21 709/224 |
| 2015/0012970 | A1* | 1/2015 | Toksvig | G06F 21/41 726/3 |
| 2015/0142980 | A1* | 5/2015 | Bragg | H04L 65/1069 709/227 |
| 2015/0181398 | A1* | 6/2015 | Garbin | H04W 4/16 455/417 |
| 2015/0295885 | A1* | 10/2015 | Congdon | H04L 61/2557 370/392 |

* cited by examiner

PORT-BASED MULTI-TENANCY ROUTER TO MANAGE WIRELESS NETWORK

CROSS-REFERENCE TO RELATED APPLICATIONS

This application hereby incorporates by reference in its entirety the following application: U.S. Provisional Patent Application No. 62/117,891, titled PORT-BASED MULTI-TENANCY ROUTER TO MANAGE WIRELESS NETWORK, and filed on 18 Feb. 2015.

BACKGROUND OF THE INVENTION

1. Field

This application relates generally to computer networking, and more particularly to a method, apparatus and system of a port-based multitenancy router to manage a wireless network.

2. Related Art

Hotspots are now found in coffee shops, airports, restaurants and various other public establishments. Hotspots can be served by one or ore programmable routers. A router can be a network device that connects multiple networks (e.g. connect a wireless local area network (LAN) with the Internet). Accordingly, a router can communicate with user's computing device to provide access to the Internet. The hotspot can service more than one user. Each user can have a status/attribute based various factors (e.g. in a hotel lobby in a hotel restaurant, in a hotel room, is a paying hotspot customers vs. is a non-paying customer, etc.). The router's administrator may want to set certain router behaviors based on these factors.

BRIEF SUMMARY OF THE INVENTION

In one aspect, a method of a multi-tenancy router to manage a wireless network comprising executing on a processor the steps of: with a port-based multi-tenancy router, assigning a set of different behaviors to different ports for wireless network access management of a wireless network; determining, with at least one computer processor, set of behaviors related to a user of one or more wireless networks; generating a list of the currently-available ports of the multi-tenancy router; and assigning one or more behaviors each port of the list of currently-available ports.

BRIEF DESCRIPTION OF THE DRAWINGS

The present application can be best understood by reference to the following description taken in conjunction with the accompanying figures, in which like parts may be referred to by like numerals.

Figure 1:
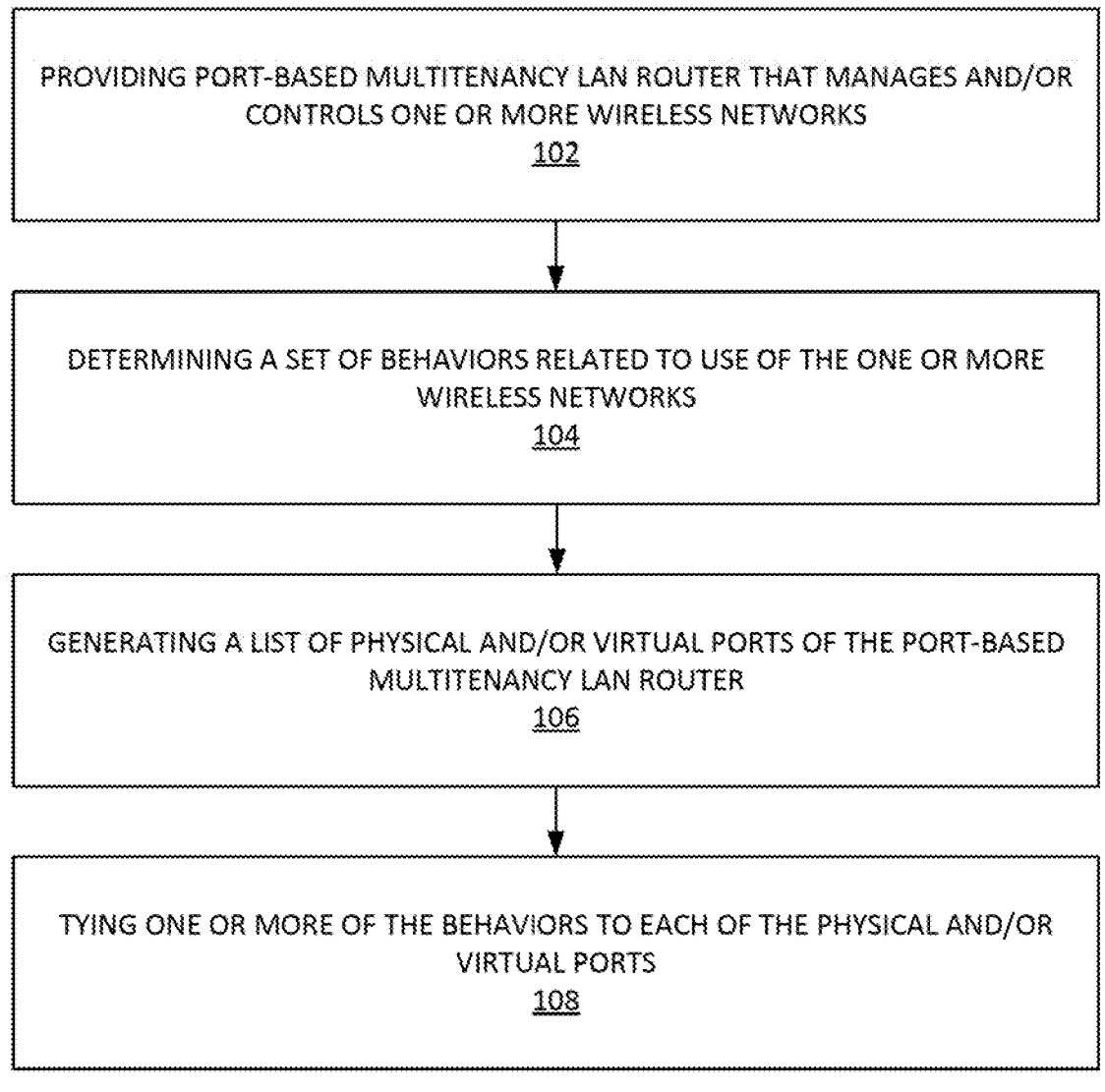
FIG. 1 depicts a flow diagram of an example process of using a multitenancy router to manage one or more wireless networks, according to some embodiments.

The Figures described above are a representative set, and are not an exhaustive with respect to embodying the invention.

DESCRIPTION

Disclosed are a system, method, and article of manufacture of a multitenancy router to manage a wireless network, according to some embodiments. Although the present embodiments have been described with reference to specific example embodiments, it will be evident that various modifications and changes may be made to these embodiments without departing from the broader spirit and scope of the particular example embodiment.

References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Definitions

Captive portal can be a special web page that is shown before using the Internet normally. The portal is often used to present a login page. This can be done by intercepting data packets, regardless of address or port, until the user opens a browser and tries to access the web.

Controller can be a routing device that can manage and direct the flow of traffic between the WLAN connected hosts and the Internet via the WAN port and provide services such as Authentication, Authorization, Auditing, Advertising, Analytics etc. Such services maybe locally hosted within the same memory space or hosted outside the routing device and referred to via the LAN or WAN ports.

Hotspot (Wi-Fi) can be a Wi-Fi network access point or area. In one example, a hotspot can be a site that offers Internet access over a wireless local area network (MAN) through the use of a router connected to a link to an Internet service provider.

Local area network (LAN) can be a computer network that interconnects computers within a limited area such as a home, school, computer laboratory, or office building, using network media.

Port can be an application-specific or process-specific software construct serving as a communications endpoint in a computer's host operating system router. As used herein, a port can be a physical port or virtual port.

Virtual LAN can be as group of devices on one or more LANs that are configured to communicate as if they were attached to the same wire, in fact they are located on a number of different LAN segments.

Virtual port can be an internet protocol (IP) alias bound to a physical port. For example, it can share all of the network settings (except the IP address) with an associated physical port.

Whitelist can be a list or register of those that are being provided a particular privilege, service, mobility, access or recognition.

Wi-Fi can be a local area wireless technology that allows an electronic device to exchange data or connect to the Internet (e.g. using 2.4 GHz UHF and 5 GHz SHF radio waves).

Wireless local area network (WLAN) can be a wireless computer network that links two or more devices using a wireless distribution method within a limited area such as a home, school, airport terminal, office building, etc.

Exemplary Processes

A multitenancy router can be used to manage one or more wireless (e.g. Wi-Fi hotspot) access points (e.g. captive portal attributes, etc.). The multitenancy router can support multi-tenancy based on different physical or virtual LAN ports within the router. In one example, a LAN port be an RJ45 connector (e.g. a standardized as the IEC 60603-7 8P8C modular connector) that takes an Ethernet wire. The LAN port can be either a physical port or a virtual port. In one example, the Ethernet wire can handle bandwidth up to one (1) gigabytes per second (Gbp/s). In another example, the LAN port can be a small form-factor pluggable (SFP) port that can take an optical fiber and handle bandwidth up to ten (10) Gbp/s. In yet another example, the LAN port can be a virtual LAN (VLAN) trunk port that operate over either RJ45 or SFP. These examples are provided by way of example and not limitation, other LAN port types can be utilized according to various other examples.

A LAN can consist of one or more switches. A switch can be connected to a router, cable modem, or asymmetric digital subscriber line (ADSL) modem for Internet access. Exemplary LANs used herein can use of redundant links with switches using a spanning tree protocol to prevent loops, their ability to manage differing traffic types via quality of service (QoS). Exemplary LANs can segregate traffic with VLANs. A LAN can include a wide variety of network devices such as switches, firewalls, routers, load balancers, and sensors.

A multitenancy router providing different behavioral patterns for captive portals over different ports. These behavioral patterns can include different, inter alia, look and feel, different network subnets, different user authentication, authorization and auditing behavior, different network speeds, different user policies (e.g. including but not limited to different download speed experience, restriction of certain uniform resource locators (URLs), different user bandwidth allowances, etc.) and/or different billing methods. Accordingly, an administrator of a multitenancy router can tie these different behaviors to different ports. Consequently, access points (e.g. a device that allows wireless devices to connect to a wired network using Wi-Fi, or related standards) connected to each of such ports can pass assigned behavioral patterns to the end users of the captive portals.

A multi-tenancy router can also enable configuration of each tenant remotely using cloud based configuration panel. A managing cloud entity can gather the configuration of each tenant separately and then makes the configuration available through the Internet. It is noted that in some embodiments, the multi-tenancy router provided herein can be utilized to tie different behaviors to different ports for purposes other than captive portal management. It is further noted that in some examples, other local area wireless technologies can be utilized in lieu of Wi-Fi standards.

FIG. 1 depicts a flow diagrams of an example process 100 of using a multitenancy router to manage one or more wireless networks (e.g. Wi-Fi hot spots), according to some embodiments. In step 102 of process 100, a port-based multitenancy router can be provided. The port-based multi-tenancy router can assign different behaviors to different ports for wireless network access management.

In step 104, a set of behaviors related to the user of one or more wireless networks can be determined. In one example, the behaviors can be curated by an administrative entity. In another example, the behaviors can be dynamically modified based on such factors as current router use, time of day, etc. Example behaviors can include: download speed experience, restriction of certain uniform resource locators (URLs), different user bandwidth allowances, captive portal attributes, etc. For example, in step 104, set of behaviors for one or more captive portals can be determined. The captive portals can be accessed when a user attempts to access local Wi-Fi hotspot for example.

In step 106, a list of the currently available physical and/or virtual ports of the multitenancy router can be generated. These ports can be operable for handling network traffic for host. In some examples, these can also be curated by an administrative entity. In another example, virtual ports can be dynamically assigned for use based on the router's workload and other similar factors. In step 108, the one or more behaviors can be tied to the one or more physical and/or virtual ports listed in step 106, In this way, each available physical and/or virtual ports of the multitenancy router an be associated with a specific set of behaviors. For example one physical port can have a specified download speed experience and certain restriction of URLs. Another virtual port can have a different download speed experience and no restrictions with respect to URLs. A captive portal for one port can have a different look and feel than another captive portal handled by another port. Different advertisements on the captive portals can be served through different ports as well.

Figure 2:
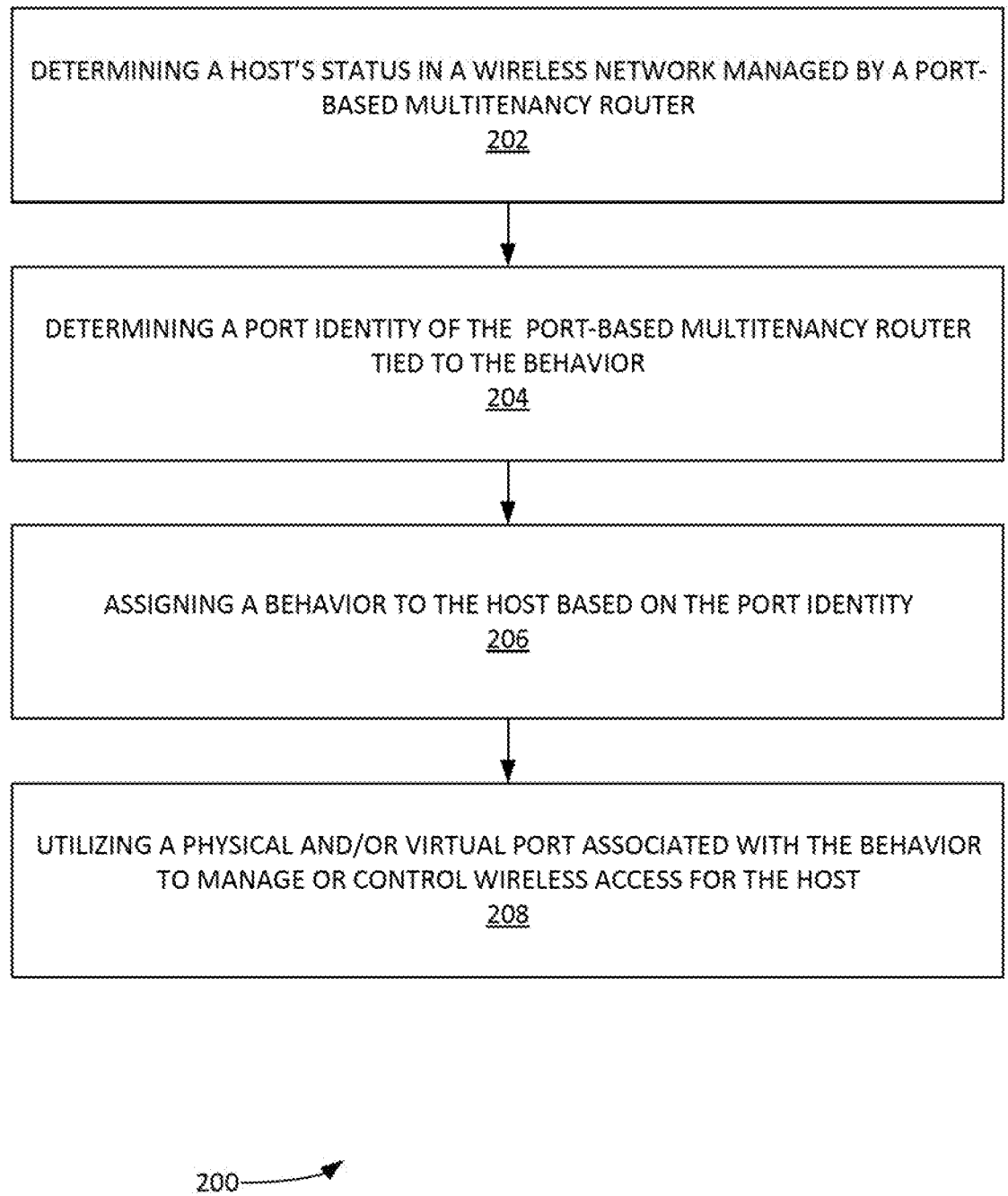
FIG. 2 illustrates an example process of providing access to a WLAN with a specified behavior based on a host's, according to some embodiments.

FIG. 2 illustrates an example process 200 of providing access to a WLAN (e.g. a Wi-Fi hotspot) with a specified behavior based on a host's status, according to some embodiments. A host can be a computer or other device connected to a computer network (e.g. a user's mobile device, a user lap top computer, a wearable computer with wireless networking capabilities, etc.). In step 202, a host's status in the wireless network can be determined. For example, the host's status can be based on such factors as, inter alia: the host's location (e.g. in a hotel room, in a hotel lobby, in a café, etc.); the user of the host computing device; the type of host computing device, the host's order n a sequence of other host devices connected with the wireless network, etc. The wireless network can be managed by a port-based multitenancy router.

In step 204, based on the assigned behavior, a port of the port-based multitenancy router can be assigned (and/or otherwise determined) to the host. For example, various ports of the port-based multitenancy router can be tied to specified behaviors.

In step 206, a behavior can be assigned to the host based on the port identity of step 204. The behavior can be assigned to the host based on the host's status. For example, if the host device is located in a hotel room, then a specified network speed and captive portal can be assigned to the host. If the host is in the hotel lobby, then another network speed and captive portal can be assigned to the host. In step 208, the assigned port can be utilized to manage and/or control wireless access for the host.

Exemplary Environment and Architecture

Figure 3:
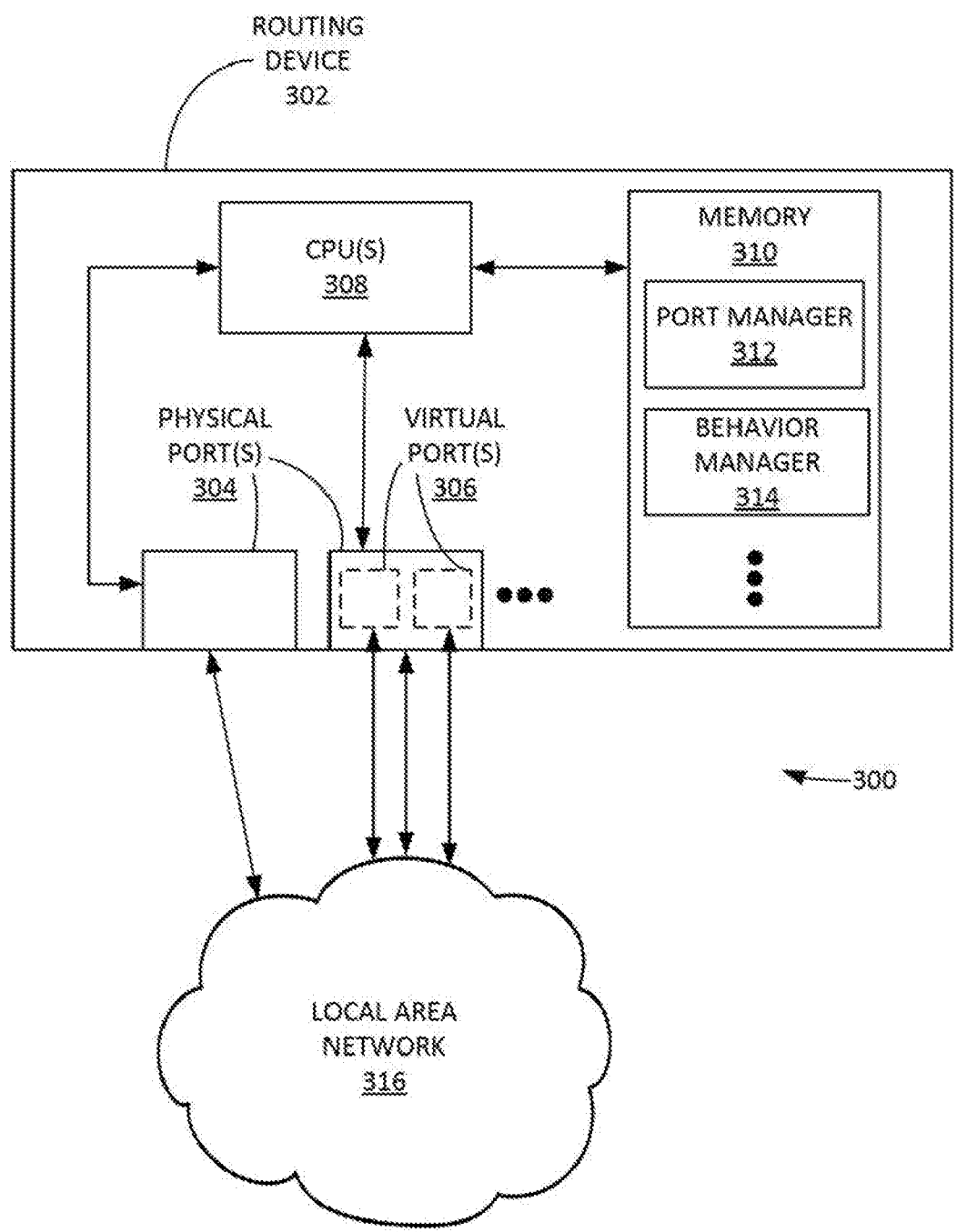
FIG. 3 is a block diagram illustrating selected elements of a physical routing device, according to some embodiments.

FIG. 3 is a block diagram illustrating selected elements of a physical routing device 302, according to some embodiments. Generally, routing device 302 can be used to forward data (traffic) to its proper destination (e.g., an end node, another router, etc.), More specifically, routing device 302 can be a port-based multitenancy outer. Routing device 302 can manage and/or control a captive portal. Routing device 302 can control access to LAN 316 (e.g. Wi-Fi hotspot). In the example of FIG. 3, the routing device 302 can include, inter alia a central processing unit(s) (CPUs) 308, a memory 310 and a number of ports including 304 and 306. CPUs 308, among its functions, can provide hardware management functions, run network control protocols, and execute the routing device's operating system. Memory 310, among its functions, stores instructions that can be executed by the CPU 110. ports including 304 and 306 can provide Memory 310 can further include a port manager 312 and a behavior an 314. Port manager 312 can manage the behavior of ports 304 and 306. Port manager 312 can manage and/or control virtual ports within a physical port. Behavior manager 314 can include instruction for determining a status of a connected host device (e.g. per process 200). Behavior manager 314 assign host device to particular ports based on the host's status and the associated port's behavior. A host device can connect to routing device 302 via LAN 316. LAN 316 can be a wireless network.

Figure 4:
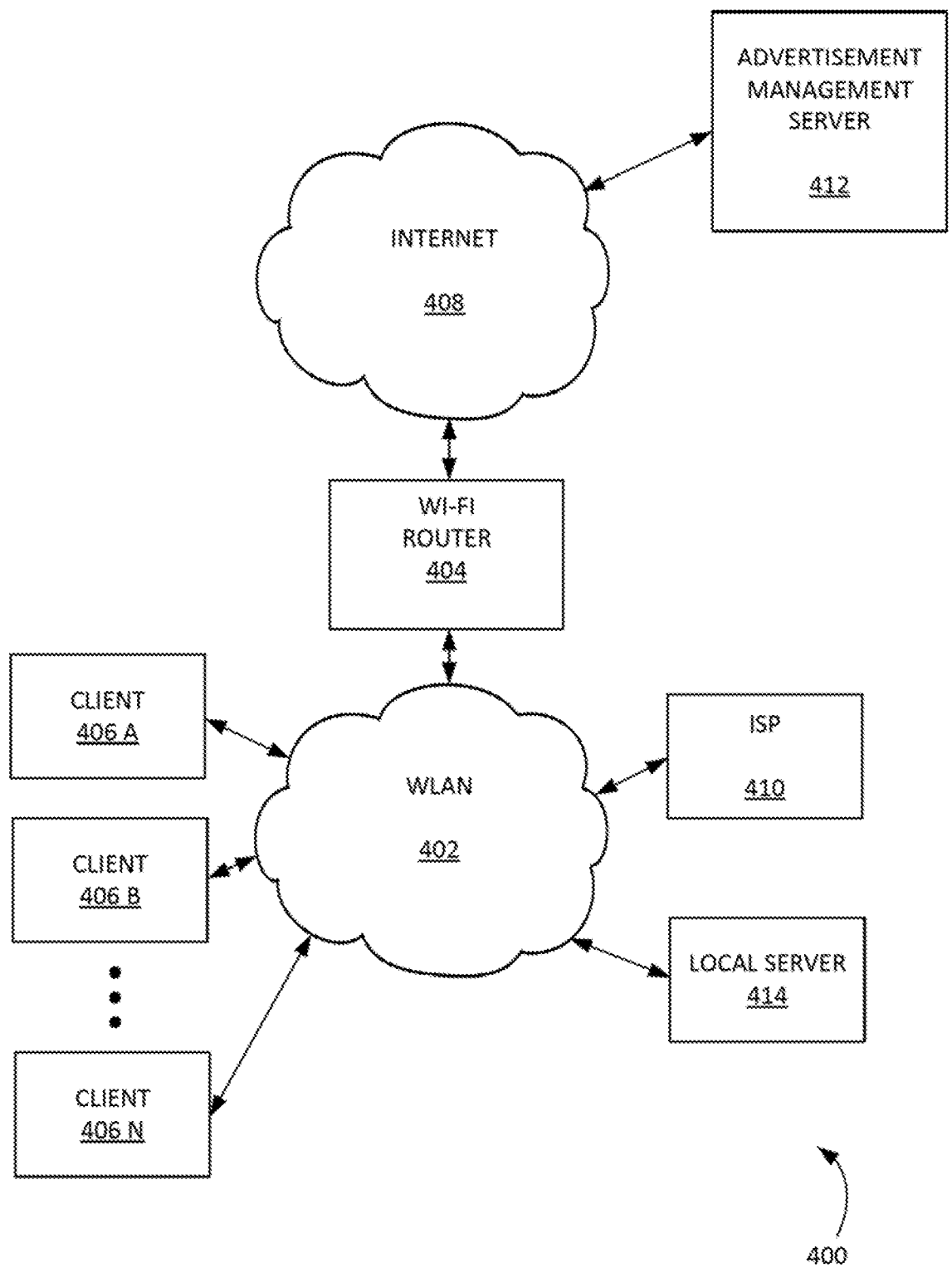
FIG. 4 depicts an architecture block diagram an example captive-portal system, according to some embodiments.

FIG. 4 depicts an architecture block diagram of an example captive-portal system 400, according to some embodiments. System 400 can include WLAN 402. WLAN 402 can be a hotspot (e.g. a Wi-Fi access point or area for connecting to the Internet 408) provided and managed by Internet service provider (ISP) 410. Clients 406 A-N can typically be web browsers that access Internet 408 via WLAN 402 and ISP 410. Clients 406 A-N can connect as host devices to WLAN 402. Clients 406 A-N can be assigned, a status based on various factors (e.g. location, etc.). Clients 406 A-N can include web browsers, ISP 410 can manage and/or control a captive portal in WLAN 402 to ensure authentication of users of clients 406 A-N. The captive portal can further include the presentation of advertisements to clients 406 A-N prior to initiating the authentication and/or payment process. In some examples, the advertisements can be interstitial web pages (e.g. inline frames that include a video) if client is a desktop-type device. In other examples, the advertisement can be a video provided via a Real Time Streaming Protocol (RTSP) protocol if the client is a mobile device client. Various techniques can be utilized by ISP 410 to redirect clients 406 A-N from the captive portal's authentication web page to advertisements such as client-side redirection, whitelisting of advertiser web pages at the WLAN's router level, caching of advertisement media content from within the WLAN, and the like. It is noted that the captive portal technique can be managed and/or controlled at the router level of the WLAN as well. Router level operations can be performed by Wi-Fi router 404. Wi-Fi router 404 can maintain an authenticated list of previously authenticated MAC addresses. Wi-Fi router 404 can be a port-based multitenancy router such as routing device 302 of FIG. 3.

Local server 414 can implement caching of advertisement media content from within the WLAN. For example, local server 414 can serve video advertisements via HTTP and/or RTSP locally from within the WLAN. Local server 414 can synchronize and download its media content from advertisement management server 412. This process can occur during periods when the WLAN's user traffic is ascertained to be low. The media content can be determined by the categorization of the WLAN and categorization of the campaigns (e.g. by location and/or local business entities who provide advertisements). For example, certain advertisement an be associated with certain IP addresses. Advertisement management server 412 can match the incoming WLAN IP address with an advertisement associated with it. Advertisement management server 412 can then replace the URL of the interstitial advertisement with the IP address of local server 414 so that the video can be served locally.

In one example, local server 414 can be a local caching device that can have a small form factor computer (e.g. ITX such as Mini-ITX, Nano-ITX, Pico-ITX, Mobile-ITX) with an x86 based microprocessor 32 or 64 bit, at least about 2 GB of RAM and a solid state drive of at least 60 GB or greater. The local caching device can also include at least one Ethernet port through which it can connect to the Wi-Fi router directly and/or to a computer network to which the Wi-Fi router is connected. The local caching device can cache multimedia objects (such as video, audio, flash files and the like) locally. To achieve the local caching device can be an the same subnet as the WLAN network. In one example, advertisement management server 412 can include information about which hotspots have such a local caching device deployed locally (e.g. by IP address). As soon as an advertisement management server 412 receives a request for an advertisement from such a hotspot, it can serve the relevant page with the URL of such files set to the local NAT IP address of this device. For example, if a hotspot's IP address is 118.75.200.118 as known to an advertisement management server 412 and the internal network address translation (NAT) IP address of the local caching device is 192.168.1.254; then, instead of serving the advertisement page with the resource's URL as <video src="/some/path/ to/resource.mp4"> advertisement management server 412 can serve the URL as <video src="http://192.168.1.254/path/to/resource.mp4">.

Figure 5:
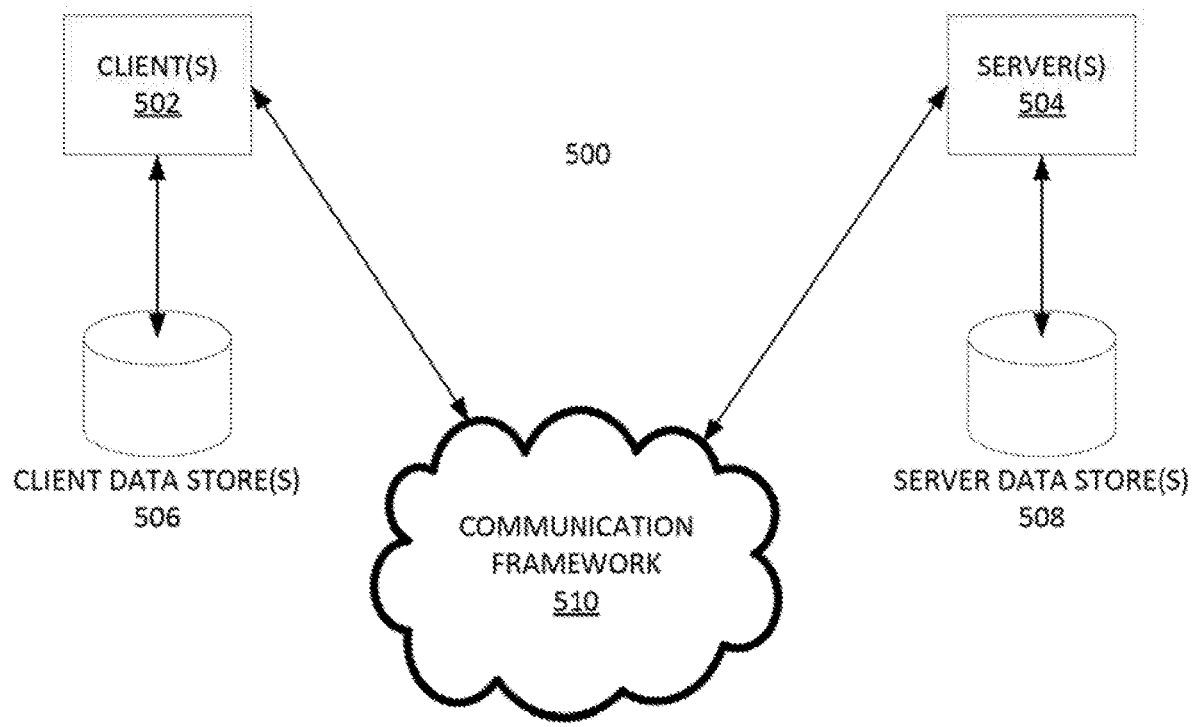
FIG. 5 is a block diagram of a sample-computing environment that can be utilized to implement some embodiments.

FIG. 5 is a block diagram of a sample-computing environment 500 that can be utilized to implement some embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 510 that can be employed to facilitate communications between the client(s) 502 and the serve(s) 504. The client(s) 502 are connected to one or more client data store(s) 506 that can be employed to store information local to the client(s) 502. Similarly, the server(s) 504 are connected to one or more server data store(s) 508 that can be employed to store information accessible by the server(s) 504.

Figure 6:
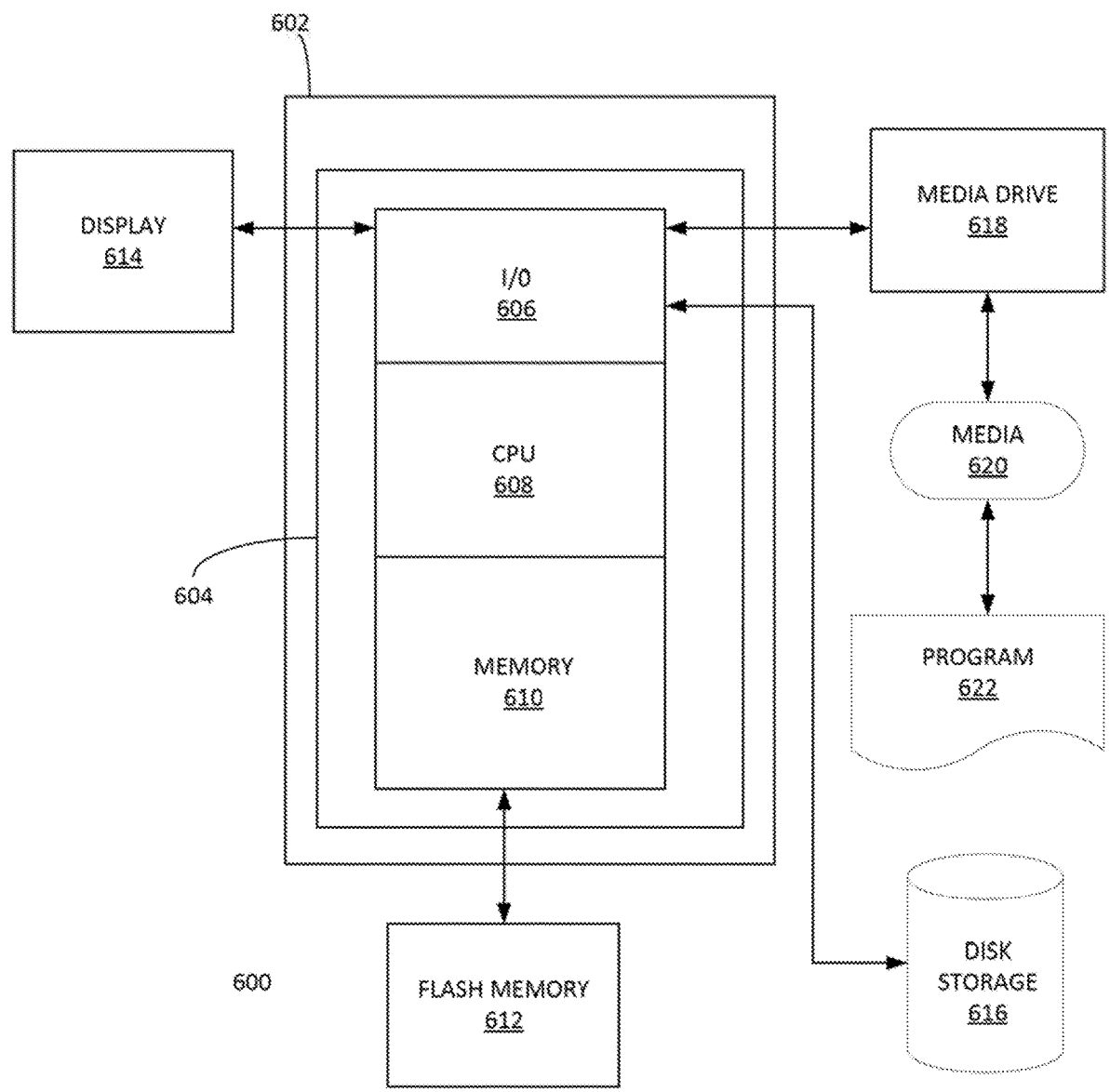
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities.

Example of Whitelisting with a Port-Based Multitenancy Router

Whitelisting of URLs can be implemented/managed/controlled with a port-based multitenancy router (and/or other router) to allow access to the content behind a set of whitelisted URLs. For example, a Wi-Fi hotspot host device can visit such a whitelisted URL and access its content even when Internet access has not been granted to the host. Walled garden is a term commonly used to describe such a behavior. Whitelisting can be managed and/or controlled with a smart whitelisting proxy (SWP) system. For example, an SWP module (not shown) can be managed and/or controlled in the memory of 310 of routing device 302. The SWP module can analyze a set of URLs. The SWP module can then learn the URLs that a particular URL can itself access. The SWP can then whitelist (and/or otherwise allow access) to all these referenced URLs. For example, SWP module can allow a host device to www.w3c.org even if the rest of the Internet is blocked. Accordingly, can be whitelisted by the SWP module.

SWP module can search its database for new URLs on a period basis (e.g. every few minutes) to acquire newly added URLs. When the SWP module acquires www.w3c.org, it then downloads the HyperText Markup Language (HTML) content behind the URL in a headless web browser (e.g. a web browse without a graphical use interface). The headless web browser can load the related resources (e.g. images, Cascading Style Sheets (CSS) files Java Script files, etc.). The SWP module can log each of these requests. For example, the SWP module can log the URLs of each of these resource requests and records them to a local data base. The SWP can then scan the downloaded HTML content for 'a' tags such that the outgoing links that the user may click through can also be recorded. The SWP module can record each of such links URL as well. If the storage and CPU availability permit, the downloaded HTML content can be stored either in a database or in memory to act as a cache.

In one example, when a user requests twww.w3c.org, the router's firewall can first transparently change the destination of the incoming Hypertext Transfer Protocol (HTTP) requests to the SWP running on the router. The SWP module can then match the URL against the stored database of URLs. If a match is found, the content can then either be served from the cache or, if not available in cache, the SWP module can then request the content on user's behalf. The SWP module can forward the content to the user device. If a match is not found in the database, then the SWP module can respond with HTTP status 302. This can cause the web browser to redirect to a captive portal hosted on the router. The SWP module can refresh the learned resource URLs on a periodic basis (e.g. every few minutes) to allow and adjust for content variations. In this way, a set of whitelisted URLS can be accessible by host device even when Internet access has not yet been granted to the user.

Example LAN Ports

In some examples, a router can support multi-tenancy based on different physical or virtual LAN ports. In some examples, a LAN port can be either an RJ45 connector that takes an Ethernet wire (e.g. can handle bandwidth up to 1 gigabyte (GB) per second (GBPS) and/or a Small Form-factor Pluggable (SFP) port that can take an optical fiber and typically handle bandwidth up to 10 GBPS, a virtual LAN (VLAN) trunk port that can operate over either RJ45 or SFP, etc.). In some embodiments, the presence of multiple such ports can be managed, controlled and/or otherwise implemented.

Example Multitenancy Functionalities

In some embodiments, multi-tenancy can include providing different behavioral patterns for network traffic coming over different ports of a controller/router. These patterns can include, inter alia: a different look and feel (e.g. user interface, etc.); different network subnets; different user authentication mechanisms (e.g. enter an email and name, verify a one-time password (OTP) aver a mobile, simple click to accept an agreement, watch a video advertisement to get internet access, interact with a form based advertisement to get internet access, interact with any form of dynamic content to get internet access, interact with an independent kiosk to get some info and then get internet access (e.g. a user views a connected screen and enters the code shown on it on the captive portal), etc.); different authorization and auditing behavior; different network speeds to devices; different user policies (e.g. including but not limited to different upload/download speed experience, restriction of certain URLs, different user bandwidth allowance, etc.); different bill plans and payment methods; etc. Additional multitenancy functionalities can also be managed, controlled and/or otherwise implemented. For example, devices can be identified based on their physical address such as a MAC address. Different behavior patterns can then be provided based on the identity. When targeting such previously identified devices for different behaviors the processing can be over and above port based identification. In other words, such identification can override the port based behaviors. Accordingly, an administrator of a router can tie different behaviors to different ports. In this way, access points connected to each of such ports can then pass these to the end users.

Another aspect of multi-tenancy can include configuring each tenant remotely using a cloud based configuration panel. For example, the cloud gathers the configuration of each tenant separately and can make it available through the Internet. Another aspect of multitenancy can include advertising utilizes. For example, different forms of advertising can be provided over different tenants. Tracking capabilities for each advertisement over each tenant can also be provided.

A controller can tie an advertisement to a unique tenant, to a set of multiple tenants and/or to many devices identified separately supported over it. This can enable the advertisement to be shown over the login page served to such tenants uniquely. It can also provide tracking metrics, such as devices the advertisement was shown across each tenant, click count across each tenant, view count across each tenant, (if the advertisement is a video then how long did it play before it was skipped, (if the advertisement is a multi-step form) then how many steps were traversed etc. The capability to track advertisement across multiple tenants also allows the controller to aggregate advertisement we across different locations belonging to the same domain or umbrella. A domain can be a logical group identifying different controllers belonging to the same entity or owner such as a chain of outlets (e.g. McDonalds®, etc.). Thus multi-tenancy can be used in unique ways to serve advertisements and build an advertisement platform over participating controllers. This controller participation can be localized to a unique domain belonging to a chain (e.g. McDonalds®, etc.) or across an entire cloud platform allowing advertisements to be published across all controllers that do not belong to their own domain.

In some embodiments, a server program implemented by the central processing unit is hosted locally in a same memory space of the port-based multi-tenancy router. In other embodiments, the server program can be implemented in a remote computing platform (e.g. a cloud-based platform).

Conclusion

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g. Pascal, C, C++ Java, Python) and/or some specialized application-specific language (PHP, JavaScript, XML). It is noted that JavaScript has been used as an example in several embodiments. However, in other embodiments, another scripting language and/or JavaScript variants can be utilized as well.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including rising means for achieving the various operations). Accordingly, the specification and drawings are to be regarded in an illustrative rather than a restrictive sense. In some embodiments, the machine readable medium can be a non-transitory form of machine-readable medium.

What is claimed:

1. A method performed by a port-based multi-tenancy router to manage a wireless network, the method comprising:

for each port in the port-based multi-tenancy router, assign a behavior from a plurality of different behaviors, wherein at least two ports in the port-based multi-tenancy router are assigned different behaviors, wherein at least one port in the port-based multi-tenancy router is a physical port and wherein at least one port in the port-based multi-tenancy router is a virtual port;

determining, based on a host device status of a host device of a user of the wireless network a set of user behaviors related to the user, wherein the host device status comprises a host-device's location, a host-device type, a host-device user's identity, or a host-device's order in a sequence of other host devices, wherein the user set of behaviors related to the user comprises:
a download speed experience of a user computing device,
a restriction of the user computing device to a non-singleton set of specified uniform resource locators (URLs),
a non-singleton set of different user bandwidth allowances, and
a non-singleton set of specified captive portal attributes;

generating a list of the currently-available ports of the port-based multi-tenancy router;

communicating data for the user using a first port in the list of currently-available ports by:
assigning the user to the first port based on the set of user behaviors and based on the assigned behaviors assigned to the first port and
communicating the data for the user via the first port and in accordance with the assigned behaviors assigned to the first port.

2. The method of claim 1,
wherein the wireless network comprises a wireless local area network.

3. The method of claim 1,
wherein the set of user behaviors is curated by an administrative entity of the port-based multi-tenancy router.

4. The method of claim 1,
wherein the first port of the port-based multi-tenancy router is assigned a specified download speed experience and a certain set of restricted of URLs, and
wherein a second port of the port-based multi-tenancy router is assigned to another specified download speed experience and no restrictions with respect to URLs.

5. The method of claim 1 further comprising:
providing a list of digital advertisements that are served via a captive portal served through the port-based multi-tenancy router; and
designating a set of digital advertisements that are served via a specified port of the port-based multi-tenancy router.

6. A computerized system of a port-based multitenancy router comprising:
at least one processor configured to execute instructions;
at least one memory containing instructions that are executed on the at least one processor, causes the at least one processor to perform operations that:
for each port in the port-based multi-tenancy router, assign a behavior from a plurality of different behaviors, wherein at least two ports in the port-based multi-tenancy router are assigned different behaviors, wherein at least one port in the port-based multi-tenancy router is a physical port and wherein at least one port in the port-based multi-tenancy router is a virtual port;
determining, based on a host device status of a host device of a user, a set of user behaviors related to the user,
wherein the host device status comprises a host-device's location, a host-device type, a host-device user's identity, or a host-device's order in a sequence of other host devices,
wherein the user is in one or more wireless networks in communication with the port-based multitenancy router,
wherein the set of user behaviors related to the user comprises:
a download speed experience of a user computing device,
a restriction of the user computing device to a non-singleton set of specified uniform resource locators (URLs),
a non-singleton set of different user bandwidth allowances, and
a non-singleton set of specified captive portal attributes;
generating a list of currently-available ports of the port-based multi-tenancy router; and
communicating data for the user using a first port in the list of currently-available ports by:
assigning the user to the first port based on at least one behavior in the set of user behaviors and based on the assigned behaviors assigned to the first port and
communicating the data for the user via the first port and in accordance with the assigned behaviors assigned to the first port.

* * * * *